Sept. 1, 1936.  F. R. NOSS  2,053,006
VALVE SEAT
Filed Jan. 9, 1935
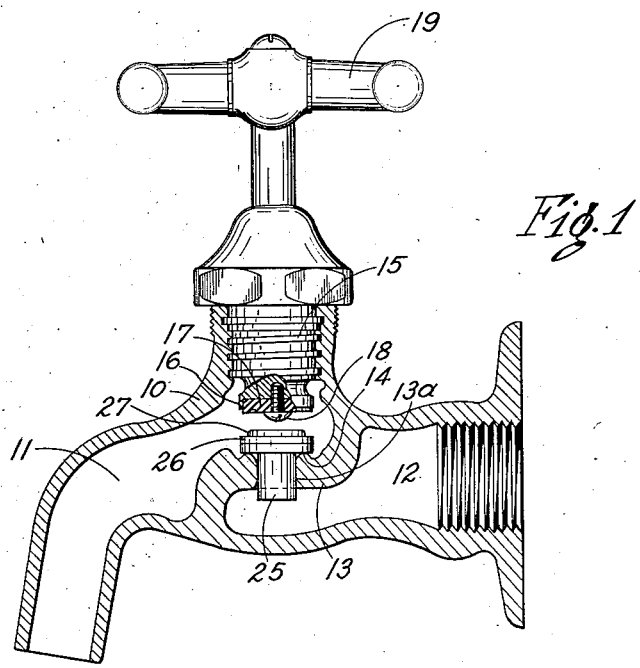
Fig.1
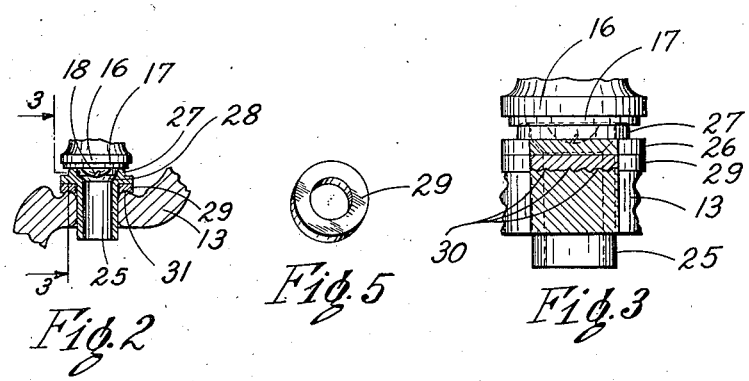
Fig.2  Fig.5  Fig.3
Fig.4
Inventor
FRANK R. NOSS
Richey & Watts
Attorneys Patented Sept. 1, 1936

2,053,006

UNITED STATES PATENT OFFICE 2,053,006

VALVE SEAT

Frank R. Noss, Cleveland, Ohio

Application January 9, 1935, Serial No. 1,039

1 Claim. (Cl. 251—167)

This invention relates to valve seats, and more particularly to valve seats especially adapted for use as replacement seats in conjunction with ordinary compression faucets in which the original valve seats have become worn or are otherwise defective.

Because of defective valve seats or washers, and also because the valves are not shut off tightly, ordinary compression faucets, and particularly hot water faucets, frequently drip or leak slowly. In course of time, this dripping or slow leaking causes the original valve seat to become wire drawn, the surface of the seat being roughened by fine grooves extending in generally radial directions across the seat. When this occurs, or when the seat becomes scored or scratched from any other cause, the faucet drips or leaks continuously no matter how tightly the valve is closed, and the leakage can not permanently be stopped by new washers, or by any means other than providing a new seat surface.

Heretofore, there has been no simple, satisfactory way to stop leakage of valves having defective seats. All satisfactory repairs have heretofore required the services of a skilled plumber. While various replaceable seats have been employed to some extent, they have not been generally satisfactory, and ordinarily it has been necessary to replace the entire valve to remedy a defective seat.

It is among the objects of my invention to provide a simple and inexpensive device whereby leakage of valves due to defective seats may be stopped. Another object is to provide such a device which may be installed by an unskilled person with a minimum of effort and without requiring any special tools. Another object is to provide a valve seat which can be easily installed or removed without requiring any change in the valve itself. Another object is to provide a replacement valve seat which overlies the ordinary valve seat and which may be installed by merely dropping or slipping the replacement seat into position. A further object is to provide a valve seat which can be economically manufactured. Another object is to provide a valve seat which may fit loosely within the valve or faucet and which does not need to be secured in position.

Other objects and advantages of my invention will become apparent from the following description of a preferred form thereof, reference being made to the accompanying drawing wherein a preferred form of my invention is illustrated in conjunction with an ordinary compression type of faucet or valve.

In the drawing, Figure 1 is a cross-sectional view of a well known type of compression faucet having my invention applied thereto and illustrating the valve in open position; Fig. 2 is a fragmentary section showing the valve in closed position; Fig. 3 is a sectional detail on an enlarged scale taken along the line 3—3 of Fig. 2; Fig. 4 is a perspective view of my replacement seat; and Fig. 5 is a perspective showing a washer preferably employed therewith.

As shown in the drawing, my valve seat is particularly adapted for use in conjunction with ordinary compression type faucets or valves which may comprise a valve body, indicated generally at 10, having passageways 11 and 12 which are separated by a partition or bridge 13 in which the usual valve seat 14 is integrally formed, the bridge being drilled in the usual manner to provide the orifice 13a. The faucet is provided with the usual stem 15 threaded into the body of the faucet and provided with a cup 16 at its lower end which is adapted to receive a washer 17. The washer may be secured to the stem by a screw 18, and the stem may be screwed downwardly to bring the washer into engagement with the seat and thus shut off the valve by means of a handle 19.

As previously described, in the course of time the valve seats are apt to become worn or wire drawn so that it is no longer possible to make a tight leak proof joint between the washer 17 and the valve seat 14. I have found that leakage can be stopped and the valve made as good as new by means of the auxiliary or replacement valve seat illustrated in the drawing. As shown herein, my replacement valve seat preferably comprises a smooth tubular guide portion 25 which is adapted to fit loosely within the aperture 13a in the partition 13 of the faucet. At its upper end my device is provided with a flange 26 of enlarged diameter and preferably formed integrally with the tubular guide portion 25. An auxiliary valve seat portion 27 which may be of substantially the same configuration as the original valve seat projects upwardly from the flanged portion 26, while the bore of the device is enlarged as indicated at 28 in order to provide ample clearance for the screw 18, as these screws may be of varying sizes in different faucets.

In order to provide a seal between the auxiliary valve seat member and the partition or bridge, I preferably employ a washer 29 which encircles the tubular guide portion 25 and is disposed between the original valve seat 14 and the lower surface of the flange 26. The washer 29 is compressed into leak tight engagement with the original valve seat when the washer 17 is brought down into engagement with the seat 27. The washer 29 may be made of various materials such as different types of fibers or various soft metals. I have found, however, that washers made of lead containing about 6% of antimony are particularly desirable as such washers are hard and strong enough to withstand the compression imposed on them when the valve is closed, and are soft enough to conform to the roughened surface of the original valve seat 14 and form a leak proof joint therewith. The deformation of the washer 29 is shown particularly in Fig. 3 of the drawing, wherein the wire drawn grooves or scratches in the original valve seat 14 are indicated at 30. It will be noted that the washer 29 has completely filled the grooves and formed a leak proof joint with the original valve seat and ordinarily the pressure between the washer and the original valve seat is sufficient to impress an annular groove in the washer as indicated at 31. Obviously, the pressure of the washer 17 also holds the washer 29 in leak proof engagement with the smooth flat under surface of the flange 26.

I prefer to make the seat flange and guide portions of my device from extruded brass rod on automatic screw machines. By this method of manufacture, the devices can be produced at minimum expense, while extruded rod is close grained and easily machined so that the surfaces of the device, and particularly the surfaces of the seat portion 27, are extremely smooth and are generally superior to the seats originally found in ordinary cast faucets. Because of the hardness and smoothness of the turned brass seat, very little pressure is required to shut off the flow of fluid through the valve, and the seats and washers have extremely long life.

In use the washer 29 apparently adheres to the original valve seat 14 sufficiently to prevent any turning from taking place between the washer 29 and the original valve seat. Apparently the rotation of the stem in the final stages of shutting off the valve either causes the washer 17 to slide or rotate with respect to the seat portion 27, or the entire replacement seat rotates with respect to the washer 29. In any event, it seems probable that the washer 29 does not rotate with respect to the original seat so that there is substantially no wear or cutting between the original seat and the washer 29 and the leak proof relationship between the washer 29 and the original seat is maintained.

The installation of my device requires no special skill and no special tools. When used as a replacement, my valve seat may be installed merely by removing the stem 15 from the faucet in the usual manner and dropping the replacement seat with the washer 29 in place thereon into the valve so that the guide portion 25 extends through the aperture 13a. For valves of ordinary sizes, the replacement seat may be conveniently guided into its proper position by an ordinary lead pencil. The new seat is automatically centered by means of the tubular guide, and after the seat has been dropped into position it is only necessary to replace the stem and close the faucet tightly. The first tight closing of the valve causes the material of the washer 29 to flow to conform to the worn seat 14 and after the first closing of the valve, little pressure is required to completely shut off the faucet. Obviously, if the washer 17 is badly worn, it should be replaced before the stem is reassembled in the faucet.

Because of the superior qualities and long life of my valve seats, it is contemplated that my valve seats may be originally installed by the manufacturers of valves and faucets. When my valve seats are used in this manner, it becomes unnecessary to finish the original valve seats, or if desired, the original valve seats need not be formed at all. In the latter case it will be sufficient to drill the orifice or aperture 13a in the bridge 13. In use, the washer 29 will be sealed against the upper surface of the bridge by the pressure of the washer 17 with the seat 27 and will adhere thereto sufficiently to prevent turning.

My tests indicate that valve seats made according to my invention have a longer life than the ordinary valve seats originally formed in faucets. However, if a replacement seat should become worn after a long period of time, it is a simple matter to remove the worn replacement seat and insert a new one, as the seat fits loosely within the valve and will not corrode thereto.

From the foregoing description of a preferred form of my invention, it will be seen that I have provided a simple and inexpensive valve seat whereby leakage of valves due to worn or defective seats may be easily and permanently stopped. My device may be manufactured economically and installed by unskilled persons without requiring the use of any special tools. While my valve seat is particularly adapted for use as a replacement, it may be originally installed in valves and faucets for use in place of or in conjunction with the ordinary valve seats. My valve seat provides a valve which is quiet in operation and which does not chatter, yet the seat fits loosely within the faucet so that it can be easily installed or removed.

In the foregoing specification, I have described a preferred form of my invention as applied to a conventional type of compression faucet. It will be obvious to those skilled in the art that my invention may be adapted to various other types of valves which may be used for controlling the flow of various liquids and gases, and that materials different from those specified herein may be employed, all without departing from the scope and spirit of my invention. It is therefore to be understood that my patent is not limited to the embodiment disclosed herein or in any manner other than by the appended claim when given the range of equivalents to which my patent may be entitled.

I claim:—

In combination with a faucet having a worn and roughened valve seat, an orifice extending therethrough and a closure member for the valve seat, a replacement valve seat disposed between said worn valve seat and said closure member, said replacement valve seat having a rigid flat flanged portion overlying said worn valve seat, a seat portion formed on said flanged portion, a smooth hollow substantially cylindrical guide portion formed integrally with said seat portion and extending loosely within said orifice, said tubular guide portion being of greater length than the distance between the seat portion and the closure member when the faucet is in wide open position and constituting the sole means for retaining said replacement seat in position, and a washer of deformable material surrounding said guide portion and disposed between said worn valve seat and the flanged portion of said replacement valve seat and deformed to conform to the roughened surface of said worn valve seat, said washer creating a seal between said worn valve seat and said replacement valve seat.

FRANK R. NOSS.